Dec. 24, 1968　　　　N. M. POTTER　　　　3,418,553

VOLTAGE CONTROLLED BATTERY CHARGER

Filed June 18, 1965　　　　　　　　　　　2 Sheets-Sheet 1

INVENTOR.
NORMAN M. POTTER
BY
ATTORNEY

United States Patent Office 3,418,553
Patented Dec. 24, 1968

3,418,553
VOLTAGE CONTROLLED BATTERY CHARGER
Norman M. Potter, Hendersonville, N.C., assignor to Union Carbide Corporation, a corporation of New York
Filed June 18, 1965, Ser. No. 464,944
3 Claims. (Cl. 320—24)

ABSTRACT OF THE DISCLOSURE

A voltage controlled battery charger comprising a transistor for controlling the charging current to the battery a resistance voltage divider connected across the battery and having a tap so as to provide a sample voltage proportional to the voltage of the battery as it is being charged, and a semi-conductor diode connected between the voltage divider tap and the base of the transistor, the diode having a minimum operating level such that when the sample voltage across the resistance voltage divider reaches a value proportional to a predetermined battery voltage below the fully charged voltage of the battery, the diode is forward biased to conduct current to the base of the transistor proportionally to the increase in battery voltage as the battery is being charged. As the battery approaches the fully charged condition, the charging current supplied through the transistor to the battery is gradually decreased or tapered towards zero.

---

This invention relates to battery chargers, and more particularly to novel and improved circuit arrangements for charging a secondary or rechargeable battery characterized in that its on-charge voltage rises until the battery reaches the fully charged condition. Illustrative battery systems of this character include alkaline zinc-manganese dioxide, lead acid and cadmium-silver oxide batteries.

A battery of the above-indicated character is generally charged by means of a tapered current charger. Battery chargers of this type commonly include an input voltage source, a rectifier, and a series resistor. The input voltage in this type of circuit is necessarily higher than the voltage of the battery when it is fully charged. In practice, the charging current decreases from a maximum value, which occurs when the battery is fully discharged, to essentially zero as the battery approaches the fully charged condition.

A major problem encountered in the use of this type of tapered current charger is that the value of the series resistor must continually be altered in order that the most advantageous charging current will be supplied in the most efficient time. A fixed resistance value will result in either too much current at one point in the charging cycle or will result in an extremely slow charging rate.

Another problem which often arises in a conventional tapered current battery charger is that charging current varies with fluctuations in the A.C. line voltage. Unfortunately, these variations in charging current cannot be controlled and when they occur it is difficult or impossible to ascertain the amount of charge delivered to the battery during the charge period.

It is a general object of this invention to provide an improved battery charger of the tapered current type.

A more specific object of this invention is to provide an improved battery charger which is capable of providing a tapered charging current to the battery under charge, which battery charger is substantially insensitive to line voltage fluctuations.

It is still another object of this invention to provide an improved battery charger which is simple, inexpensive and compact.

It is still another object of this invention to provide an improved battery charger which actually "senses" the state of charge of the battery and which is capable of rapidly restoring only the required amount of energy necessary to bring the battery to a condition of full charge.

A still further object of this invention is to provide an improved battery charger that operates directly from an A.C. voltage source without the need of a separate rectifying circuit.

Other objects and advantages of the invention will become apparent from the following description, taken in conjunction with the acompanying drawings, wherein.

In accordance with the invention, there is provided a battery charger comprising a transistor for controlling the amount of charging current delivered to the battery under charge and a reference device which, when operating, effectively reduces the amount of charging current to the battery. Specifically, the reference device may be one or more semi-conductor diodes in series. The semi-conductor diode may be of the silicon or germanium type.

In operation, a selected portion of battery voltage is applied across the reference diode and the level of this voltage determines the quantity of current which flows through the diode. As the diode current increases, the quantity of transistor base current decreases. Since the charging current which flows through the emitter-collector path of the transistor is directly dependent on the quantity of base current, the charging current decreases as the diode current increases. Therefore, as the battery voltage increases, the charging current decreases toward zero.

A semi-conductor diode is a solid state device characterized in that it conducts current only when the forward bias which is applied is above a certain minimum level and in that it exhibits a rather high resistance to current when it is biased in the reverse direction. In the several circuits of the invention to be described, the semi-conductor diode is forward biased either below or above its minimum operating level, the bias voltage being determined by the state of charge of the battery. The relationship of voltage and current in this device is non-linear and may be obtained from a characteristic curve which is published by the manufacturer of the device. For a more detailed description of the semi-conductor diode and its characteristics, reference is made to Chapter 8 of "Semi-Conductor Devices and Applications" by R. A. Greiner, McGraw-Hill, 1961.

Figure 1:
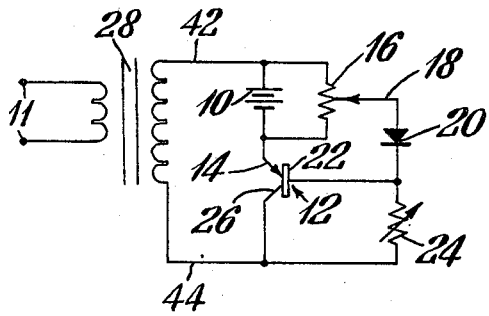
FIGURE 1 is a circuit diagram illustrating one embodiment of the battery charger of the invention.

This invention will be more readily understood by referring to the drawings and particularly to FIGURE 1.

As illustrated in FIGURE 1, the battery to be charged as indicated by the numeral 10 is placed into a charging circuit comprising a transistor 12 which is illustrated as being of the p-n-p type. The transistor 12 is connected at its emitter 14 to the negative terminal of the battery. A resistive voltage divider 16 having a tap 18 is connected directly across the battery. The tap 18 is connected in series with a semiconductor diode 20 which is directly connected to the base 22 of the transistor 12. A resistor 24, which may be variable, is provided between the base 22 and the collector 26 of the transistor 12. An input transformer 28 transfers the line voltage which is supplied at the input terminals 11 to the charging circuit. The secondary terminals 42 and 44 of the input transformer 28 are connected to the positive terminal of the battery on one end 42 and to the collector 26 of the transistor 12 on the other end 44.

Figure 4:
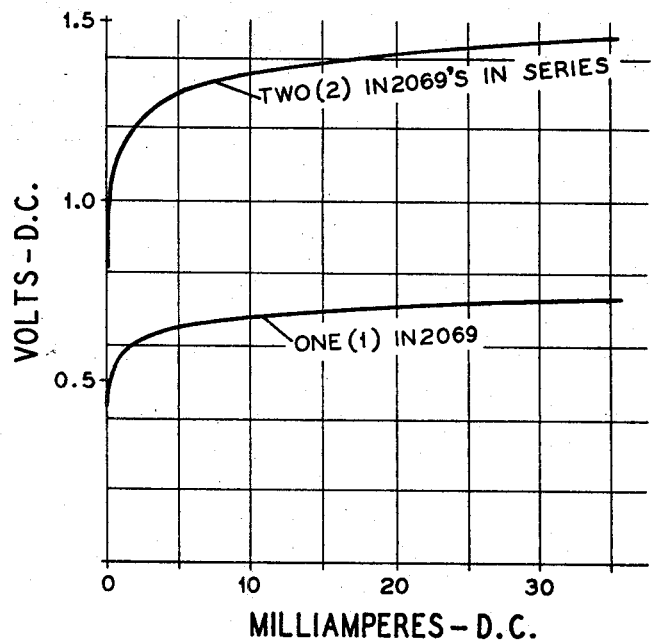
FIGURE 4 is a graph illustrating the current-voltage relationships of typical semi-conductor diodes which may be employed in the battery charger of the invention.

In the operation of the circuit of FIGURE 1, an A-C source which is connected at the input terminals 11, provides a current which is fed from the secondary of the transformer 28 through the battery 10 and the transistor 12. The transistor is so biased that only one-half of each cycle of A.C. current is allowed to pass through the battery, thus producing a pulsating D.C. current with which the battery is charged. As the battery is charged, the voltage at the battery terminals and across the voltage divider 16 increases. The voltage between the tap 18 and the emitter 14 increases in proportion to the increase in battery voltage. This voltage, which is referred to as the "sample voltage," is equivalent to the algebraic difference of the voltage across the diode 20 and the voltage between the emitter 14 and the base 22 of the transistor 12. The voltage across the diode is directly related to the current through the device. This relationship may best be illustrated by a voltage-current graph which is characteristic of the device and is illustrated in FIGURE 4, for example. As the sample voltage increases, therefore, the voltage across the diode 20 increases proportionally and the voltage from the emitter to base of the transistor 12 decreases. When the voltage across the diode exceeds a minimum level, the diode begins to conduct current. As the battery voltage increases, the current through the diode increases according to the characteristic curve of the diode (see FIGURE 4). This increase in diode current causes a decrease in the quantity of current flowing from the base 22 of the transistor 12 since the current through the resistor 24 is substantially constant due to the relatively large value of resistance of the resistor 24. The reduction in base current serves to reduce the emitter current to the battery since this current value is directly related to the quantity of current which flows from the base. As the battery becomes charged, the current through the diode increases rapidly, thereby further decreasing the current to the battery. This operation continues until there is no longer an effective current flow from the base 22. At this point, the transistor 12 is substantially non-conductive. Thus, it will be observed that the charging current is gradually decreased or tapered to essentially zero as the battery approaches full charge.

The circuit of FIGURE 1 is characterized in that it operates directly from the line voltage A.C. source. This is possible because the transistor 12 operates in a dual capacity. It not only serves as a control component for the charging current but also functions as a rectifier since it is properly biased to allow conduction for only half cycles of line current. Because the semi-conductor diode 20 will not conduct when it is biased in the reverse direction, it supplements the rectifying action of the transistor by preventing current flow in the circuit during the non-conductive half-cycle periods. In this manner, a half-wave D.C. charging current automatically flows through the battery without the use of a separate rectifying circuit.

Although the previously described embodiment is intended for operation from the A.C. power lines, the circuit of FIGURE 1 may be easily modified for direct current input without loss of the current control function and overcharge protection inherent in the circuit. The modification may be effected by disconnecting the transformer secondary winding from terminals 42 and 44 and connecting a D.C. source of proper voltage and polarity to terminals 42 (positive) and 44 (negative). In this manner, a charger could be constructed to operate from either a 120 volt A.C. line or a 12 volt D.C. automobile generator supply as for example, by simply throwing a switch and connecting into the proper power outlet.

It will be appreciated from the discussion above that the semi-conductor diode is a primary instrument which is employed to control the flow of charging current to the battery. Because of the nature of operation of this component in the circuit, line voltage variations have little effect on the final battery voltage level which is achieved. Even greater control may be achieved if the effect of the voltage variation of the emitter-base junction of the transistor could be reduced. This may be accomplished in practice by providing two or more semi-conductor diodes 20' in series as in FIGURE 3. The use of several diodes in this manner increases the minimum voltage level at which the diodes will conduct, thereby increasing the proportion of the sample voltage which is present across the diodes. This, in effect, reduces the influence of emitter-base junction voltage on current flow in the circuit and increases the control by the diodes.

Figure 5:
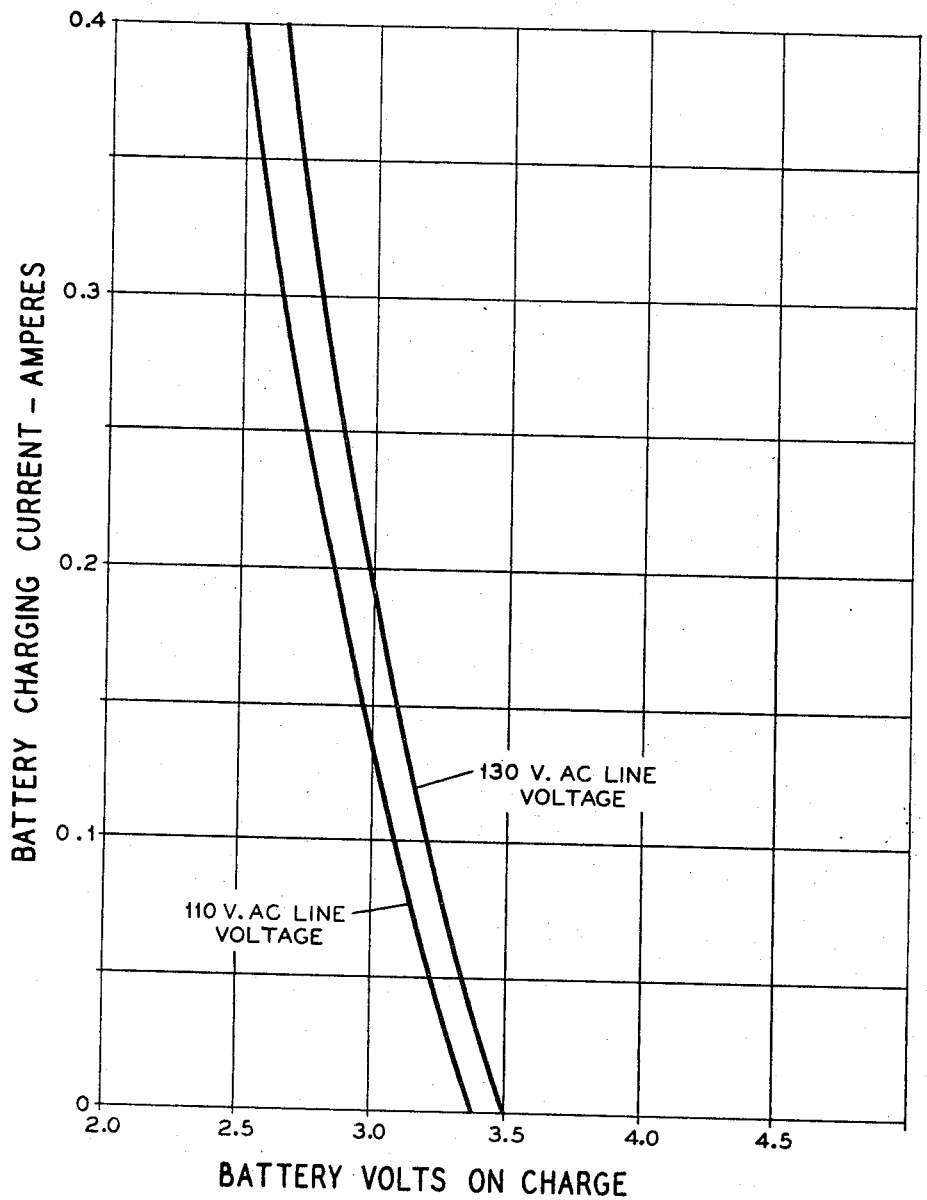
FIGURE 5 is a graph illustrating the performance of the battery charger of FIGURE 1.

Furthermore, varying the number of diodes 20' used in series is a useful design tool in establishing the sharp slope or taper of the characteristic charging curve relating on-charge voltage to charge current, a typical illustration of which curve is given in FIGURE 5. The improved slope or taper may be best explained by referring to the circuit of FIGURE 1 wherein it is observed that the emitter to base voltage of the transistor 22 would be unchanged if two diodes were employed as long as the tap 18 on the voltage divider 16 was repositioned to increase the sample voltage by the required amount. The repositioning of the tap causes a greater proportion of the battery voltage to become sample voltage thereby resulting in a more sensitive control circuit.

Figure 2:
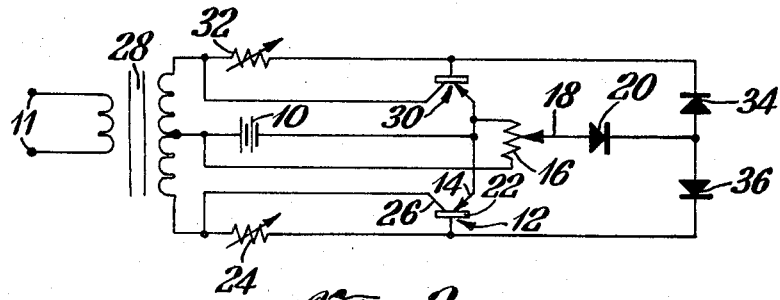
FIGURE 2 is a circuit diagram illustrating another embodiment of the invention.

A modification of the circuit of FIGURE 1 is illustrated in FIGURE 2. The modification consists primarily in the addition of a second transistor 30, the resistor 32 and diodes 34 and 36. These additional components enable the circuit to be operative over each full cycle of A.C. supply voltage. The transistor 30 is biased so as to permit conduction during the non-conducting half cycle of the transistor 12. In this manner a full-wave rectification is accomplished without the need of separate rectifying circuitry thereby providing the battery with a higher quality D.C. current. The diodes 34 and 36 prevent reverse current flow through the transistors.

The operation of the charger of FIGURE 2 is substantially the same as that of FIGURE 1, except that rectification occurs on both half-cycles of the input A.C. signal due to the operation of the transistors 12 and 30.

Figure 3:
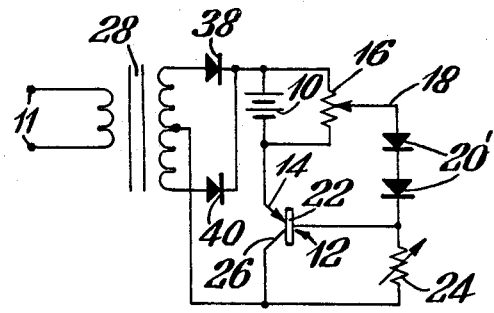
FIGURE 3 is a circuit diagram illustrating still another embodiment of the invention.

The circuit of FIGURE 3 is similar to that of FIGURE 1, but the addition of diodes 38 and 40 in conjunction with a center tapped secondary winding of transformer 28 provides full wave rectified current to the battery 10 and transistor 12 thereby relieving the transistor of its rectifying function. Charge current is controlled by the interaction of diodes 20' and transistor 22 as a function of battery voltage in the same manner as that described with respect to FIGURE 1 and FIGURE 2.

FIGURE 4 is included to illustrate a typical characteristic curve of a semi-conductor diode relating the voltage and current of the device. Included also in FIGURE 4 is a characteristic curve of two typical semi-conductor diodes in series. It may be observed from this curve that a higher voltage potential is required across the diodes to produce a given current than is required with a single diode; however, the amount of current change for a given amount of voltage change at corresponding current levels remains the same.

As an example of the invention, a battery charger substantially identical to the circuit of FIGURE 1 (with the exception that two diodes in series were used in place of diode 20), was employed to charge a two cell alkaline zinc manganese dioxide battery to a fully charge voltage of 3.5 volts. The circuit was designed for a maximum charging current of about 0.4 ampere for a minimum battery voltage of 2.6 volts and was constructed utilizing the following components:

2 Silicon diodes 20—1N2069 manufactured by RCA,
Transistor 12—2N554 manufactured by Motorola
Voltage divider 16—48 ohm, 1 watt
Resistance 24—830 ohm, 1 watt In the first test the battery charger was operated from a 110 volt A.C. input corresponding to a transformer secondary voltage of 8.1 volts A.C. In the second test the A.C. input voltage was maintained at 130 volts wth a corresponding transformer secondary voltage of 9.5 volts A.C. The results of these tests are illustrated in FIGURE 5. It will be noted that the taper or slope of the two charging curves is virtually the same, and that the final on-charge voltage of the battery for each test was nearly the same (only about 0.1 volt difference). Furthermore, the curves illustrate that the battery charger of the invention will perform within a generally predictable battery voltage-charging current relationship, i.e. that area which is bounded by the two illustrated curves. Because battery voltage is related to the state of charge, it can be further seen from the graph of FIGURE 4 that a substantial portion of the battery capacity was restored during the early portion of the charge period.

In the circuits of the invention, transistors of either polarity type may be employed. Thus, when p-n-p types are shown, n-p-n types may be substituted provided the connections to the battery and all the diodes are reversed.

From the above, it will be seen that the battery charger of the invention is simple, inexpensive, and because of the small number of components required may be compactly assembled. It has the further advantage of being capable of operating when supplied with either a direct current or an alternating current source. Furthermore, the overall performance is virtually unaffected by substantial changes in input source voltage, thereby insuring rapid and complete battery charge with no danger of overcharge.

We claim:
1. In a battery charger, the combination of a transistor having an emitter, collector and a base, said transistor being connected at its emitter in series with the battery to be charged; a resistance voltage divider connected across said battery, said resistance voltage divider having a tap so as to provide a sample voltage proportional to the voltage of said battery; and a semi-conductor diode connected between said tap and the base of said transistor, said diode having a minimum operating level such that when the sample voltage across said resistance voltage divider reaches a value proportional to a predetermined battery voltage below the fully charged voltage of the battery, said diode is forward biased to conduct current to the base of said transistor proportionally to the increase in battery voltage as the battery is being charged whereby the charging current supplied through said transistor to the battery is decreasedor tapered toward zero as said battery approaches the fully charged condition.

2. A battery charger comprising, in combination, a transistor having an emitter, collector and a base, said transistor being connected at its emitter in series with the battery to be charged; an alternating current source including transformer means connected across said battery and said transistor; a resistance voltage divider connected across said battery, said resistance voltage divider having a tap so as to provide a sample voltage proportional to the voltage of said battery; a pair of series connected semi-conductor diodes connected between said tap and the base of said transistor, said diodes having a minimum operating level such that when the sample voltage across said resistance voltage divider reaches a value proportional to a predetermined battery voltage below the fully charged voltage of the battery, said diodes are forward biased to conduct current to the base of said transistor proportionally to the increase in battery voltage as the battery is being charged whereby the charging current supplied through said transistor to the battery is decreased or tapered toward zero as said battery approaches the fully charged condition; and resistance means connected between said collector and said base of said transistor.

3. A battery charger comprising in combination, an alternating current source including a transformer having a center tap; a battery to be charged connected to said center tap; a first tansistor having an emitter, collector and base, said transistor being connected at its emitter in series with said battery and at its base with one terminal of said transformer, a resistance voltage divider connected across said battery, said resistance voltage divider having a tap so as to provide a sample voltage proportional to the voltage of said battery; first resistance means connected between said base and said collector of said first transistor; a second transistor having an emitter, collector and base, said second transistor being connected at its emitter in series with said battery and at its base with the other terminal of said transformer; second resistance means connected between said base and said collector of said second transistor; and a semi-conductor diode connected between said tap of said resistance voltage divider and the base of said first transistor and said second transistor, said diode having a minimum operatiing level such that when the sample voltage across said resistance voltage divider reaches a value proportional to a predetermined battery voltage below the fully charged voltage of the battery, said diode is forward biassed to conduct current to the base of said transistor proportionally to the increase in battery voltage as the battery is being charged whereby the charging current to said battery is decreased or tapered toward zero as said battery approaches the fully charged condition.

References Cited
UNITED STATES PATENTS

| | | | |
|---|---|---|---|
| 3,117,269 | 1/1964 | Pensak | 320—40 |
| 3,179,871 | 4/1965 | Bagno | 320—30 |
| 3,226,623 | 12/1965 | Krueger et al. | 320—39 X |
| 3,237,078 | 2/1966 | Mallory | 320—17 |
| 3,281,639 | 10/1966 | Potter et al. | 320—43 |
| 3,293,445 | 12/1966 | Levy | 321—45 X |
| 3,313,996 | 4/1967 | Lingle | 321—46 X |
| 3,215,922 | 11/1965 | Olsen et al. | 320—40 |

LEE T. HIX, *Primary Examiner.*

S. WEINBERG, *Assistant Examiner.*

U.S. Cl. X.R.

320—39, 57

UNITED STATES PATENT OFFICE
CERTIFICATE OF CORRECTION

Patent No. 3,418,553            Dated Dec. 24, 1968

Inventor(s) POTTER, NORMAN M.

It is certified that error appears in the above-identified patent and that said Letters Patent are hereby corrected as shown below:

Column 2, line 1, "still" should be deleted.

" 2, line 61, "This" should read -- The --

" 5, line 11, "wth" should read -- with --

" 5, line 58 (claim 1), "decreasedor" should read -- decreased or --

" 6, line 21 (claim 3), "tansistor" should read -- transistor --

" 6, line 42 (claim 3), "transistor" should read -- transistors --

Signed and Sealed this fourth Day of November 1975

[SEAL]

Attest:

RUTH C. MASON
*Attesting Officer*

C. MARSHALL DANN
*Commissioner of Patents and Trademarks*